United States Patent
Pascal

(10) Patent No.: US 10,842,065 B1
(45) Date of Patent: Nov. 24, 2020

(54) SOIL LOOSENING TOOL HAVING RECIPROCATING SPIKES

(71) Applicant: Warren D. Pascal, Rockville, MD (US)

(72) Inventor: Warren D. Pascal, Rockville, MD (US)

( * ) Notice: Subject to any disclaimer, the term of this patent is extended or adjusted under 35 U.S.C. 154(b) by 0 days.

(21) Appl. No.: 16/733,592

(22) Filed: Jan. 3, 2020

(51) Int. Cl.
| *A01B 1/24* | (2006.01) |
| *A01B 35/06* | (2006.01) |
| *A01B 35/24* | (2006.01) |
| *A01B 19/02* | (2006.01) |
| *A01B 1/16* | (2006.01) |
| *A01B 63/00* | (2006.01) |
| *A01B 45/02* | (2006.01) |

(52) U.S. Cl.
CPC ............ *A01B 35/06* (2013.01); *A01B 1/16* (2013.01); *A01B 1/24* (2013.01); *A01B 19/02* (2013.01); *A01B 35/24* (2013.01); *A01B 45/023* (2013.01); *A01B 63/008* (2013.01)

(58) Field of Classification Search
CPC .. A01B 1/16; A01B 1/24; A01B 1/243; A01B 39/10; A01B 41/02; A01B 45/02; A01B 45/023
USPC ............................. 172/21, 42, 58, 77, 125
See application file for complete search history.

(56) References Cited

U.S. PATENT DOCUMENTS

| 2,804,336 | A | * | 8/1957 | Thompson | ................ E01H 1/12 294/61 |
| 3,163,236 | A | * | 12/1964 | Ray | ...................... A01B 45/023 172/21 |
| 3,802,513 | A | * | 4/1974 | Ploenges | .............. A01B 45/023 172/21 |
| 3,834,464 | A | * | 9/1974 | Carlson | ................ A01B 45/023 172/22 |
| 4,541,492 | A | * | 9/1985 | Motruk | .................. A01B 1/065 172/40 |
| 5,370,433 | A | * | 12/1994 | Yost | ......................... A01D 9/06 294/50.5 |
| 5,868,206 | A | * | 2/1999 | Miller | .................. A01B 45/023 172/21 |
| 7,669,667 | B2 | * | 3/2010 | Petersen | .............. A01B 45/023 172/101 |
| 8,813,862 | B2 | * | 8/2014 | Yamaoka | .................. A01B 1/16 172/25 |
| 2008/0029279 | A1 | * | 2/2008 | Zuccarello | ............. A01B 1/065 172/42 |
| 2013/0168114 | A1 | * | 7/2013 | Yamaoka | ................ A01B 1/16 172/41 |

* cited by examiner

*Primary Examiner* — Gary S Hartmann
(74) *Attorney, Agent, or Firm* — Welsh Flaxman & Gitler LLC

(57) ABSTRACT

A handheld gardening tool includes a power source, a spike projection device adapted to roughen soil for the application of grass seeds or to ease pulling weeds, and a support arm connecting the power source to the spike projection device. The spike projection device comprises a housing supporting a plurality of spikes mounted within the housing for controlled extension from and retraction within the housing for engagement with soil.

16 Claims, 6 Drawing Sheets

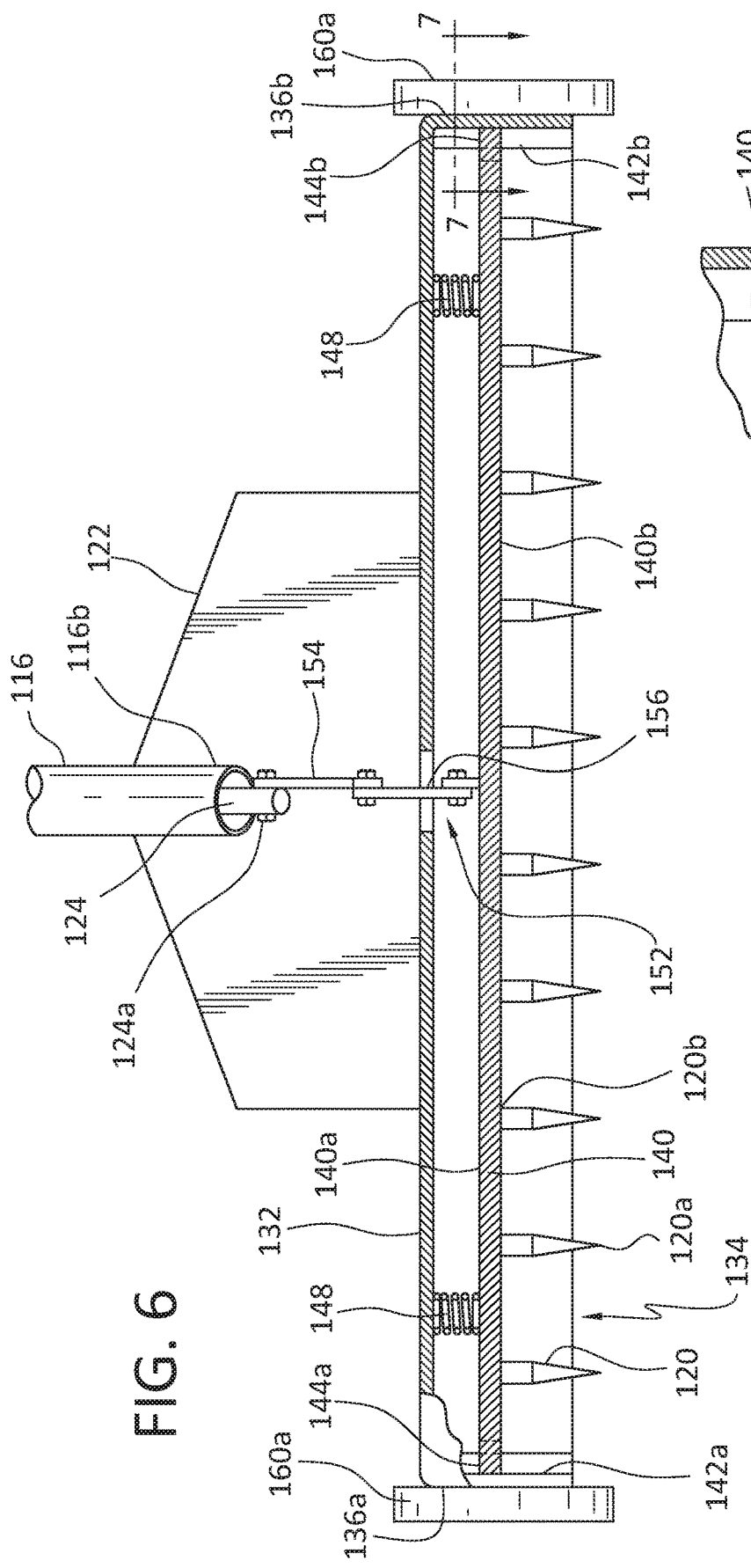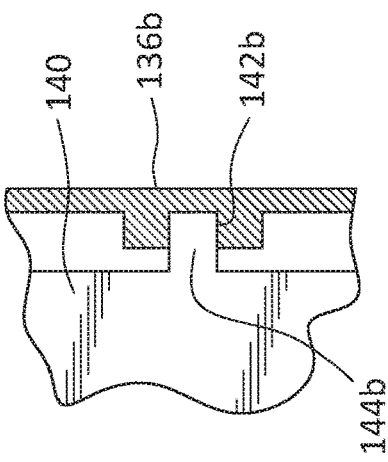

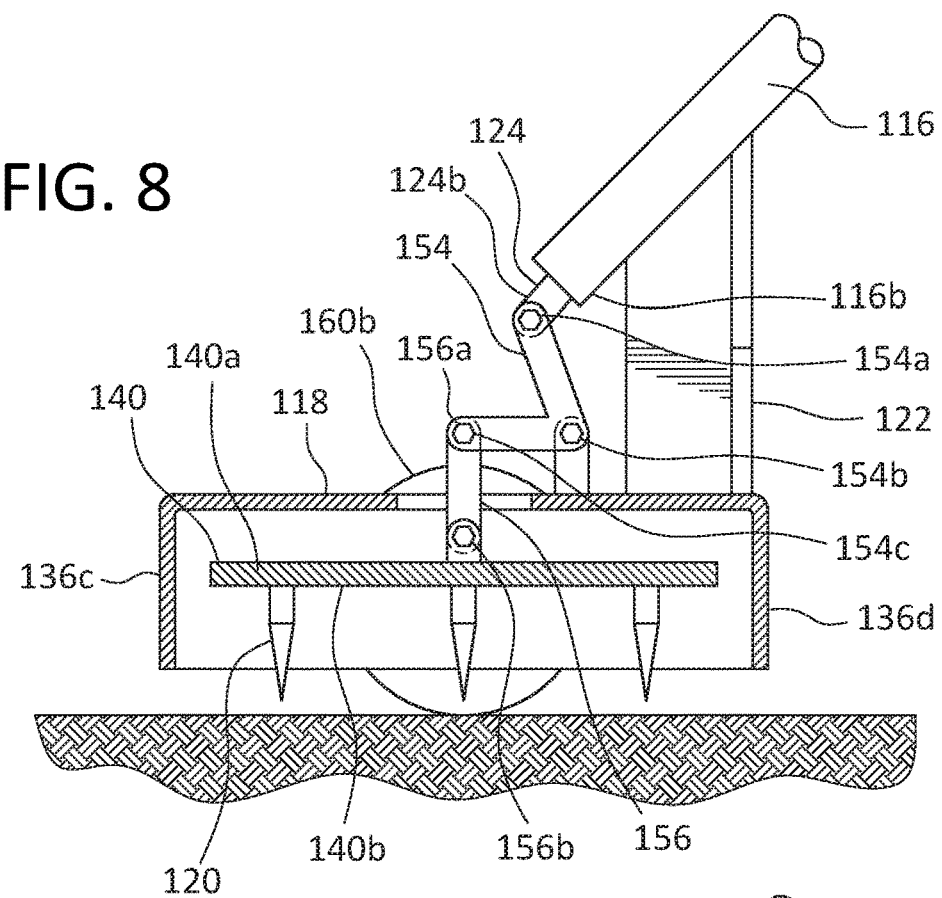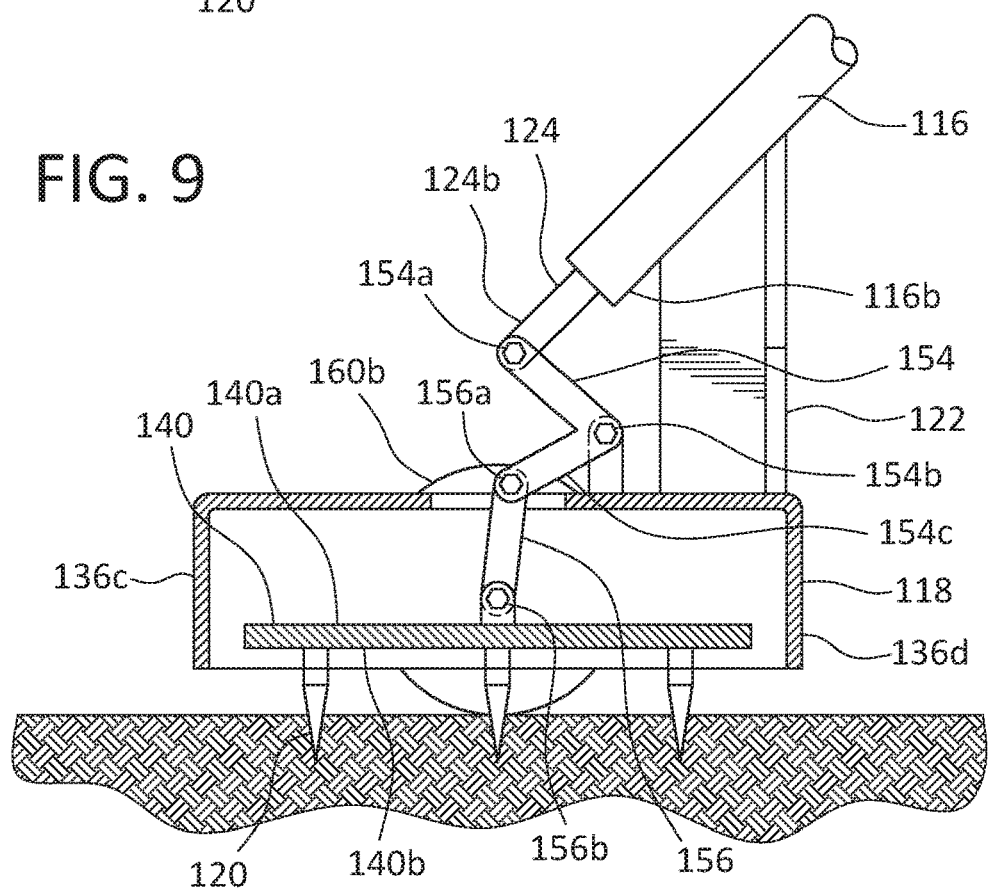

SOIL LOOSENING TOOL HAVING RECIPROCATING SPIKES

BACKGROUND OF THE INVENTION

1. Field of the Invention

The invention relates to handheld gardening tools.

2. Description of the Related Art

Anyone who has attempted to grow grass will appreciate the need to loosen the soil before applying the seeds to the soil. It will also be appreciated that loosening soil with rakes and shovels can be very labor intensive. It is even more difficult when the grass/dirt is extremely hard and conventional hand tools will not work in breaking up the hard soil to allow for the planting of grass seed or other seeds with ease. Further, it is one would like to plant something at ease. It is also difficult to loosen soil in a specific location where the location requiring seeding is relatively small and it is desirable to not disturb the surrounding soil. Similar problems are commonly encountered when loosening soil in flower beds before planting or loosening soil in an effort to assist in the removal of weeds.

With this in mind, the present invention provides a handheld gardening tool specifically adapted to address the needs of those wishing to loosen soil in small areas.

SUMMARY OF THE INVENTION

It is, therefore, an object of the present invention to provide a handheld gardening tool including a power source, a spike projection device adapted to roughen soil for the application of grass seeds or to ease pulling weeds, and a support arm connecting the power source to the spike projection device. The spike projection device comprises a housing supporting a plurality of spikes mounted within the housing for controlled extension from and retraction within the housing for engagement with soil.

It is also an object of the present invention to provide a handheld gardening tool wherein in the power source includes an electric reciprocating linear motor secured to a rechargeable battery.

It is an object of the present invention to provide a handheld gardening tool wherein the spike projection device includes a mounting plate to which the plurality of spikes are mounted.

It is a further object of the present invention to provide a handheld gardening tool wherein a power input member links the mounting plate to a drive shaft linked to the power source.

It is also an object of the present invention to provide a handheld gardening tool wherein in the power source includes an electric rotary motor selectively secured to a rechargeable battery.

It is another object of the present invention to provide a handheld gardening tool wherein the spike projection device includes a camming mechanism that controls the movement of the spikes.

It is a further object of the present invention to provide a handheld gardening tool wherein the camming mechanism includes a plurality of cam shafts.

It is also an object of the present invention to provide a handheld gardening tool wherein the cam shafts include annular eccentric camming surfaces that interact with the heads of respective spikes.

It is another object of the present invention to provide a handheld gardening tool wherein a drive shaft extends through the support arm and connects the power source to the spike projection device.

It is a further object of the present invention to provide a handheld gardening tool wherein the drive shaft is driven by an electric reciprocating linear motor.

It is also an object of the present invention to provide a handheld gardening tool wherein the spike projection device includes a mounting plate to which the plurality of spikes are mounted and a power input member links the mounting plate to the drive shaft.

It is another object of the present invention to provide a handheld gardening tool wherein the power input member is a pivoting linkage assembly.

It is a further object of the present invention to provide a handheld gardening tool wherein the drive shaft is driven by an electric rotary motor.

It is also an object of the present invention to provide a handheld gardening tool wherein the spike projection device includes a camming mechanism driving the plurality of spikes and a power input member links the camming mechanism to the drive shaft.

It is another object of the present invention to provide a handheld gardening tool including a handle member that is secured along a central body portion of the support arm.

It is a further object of the present invention to provide a handheld gardening tool wherein the spike projection device includes wheels.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 6 is a cross sectional view of the handheld gardening tool shown in FIG. 1.

FIG. 7 is a lateral cross sectional view along the line 7-7 in FIG. 6.

FIGS. 8 and 9 are lateral cross sectional views showing operation of the handheld gardening tool shown in FIG. 5. It should be noted the springs shown in FIG. 7 are not shown to make certain the movement of the power input member and mounting plate is clearly shown.

DESCRIPTION OF THE PREFERRED EMBODIMENTS

Figure 1:
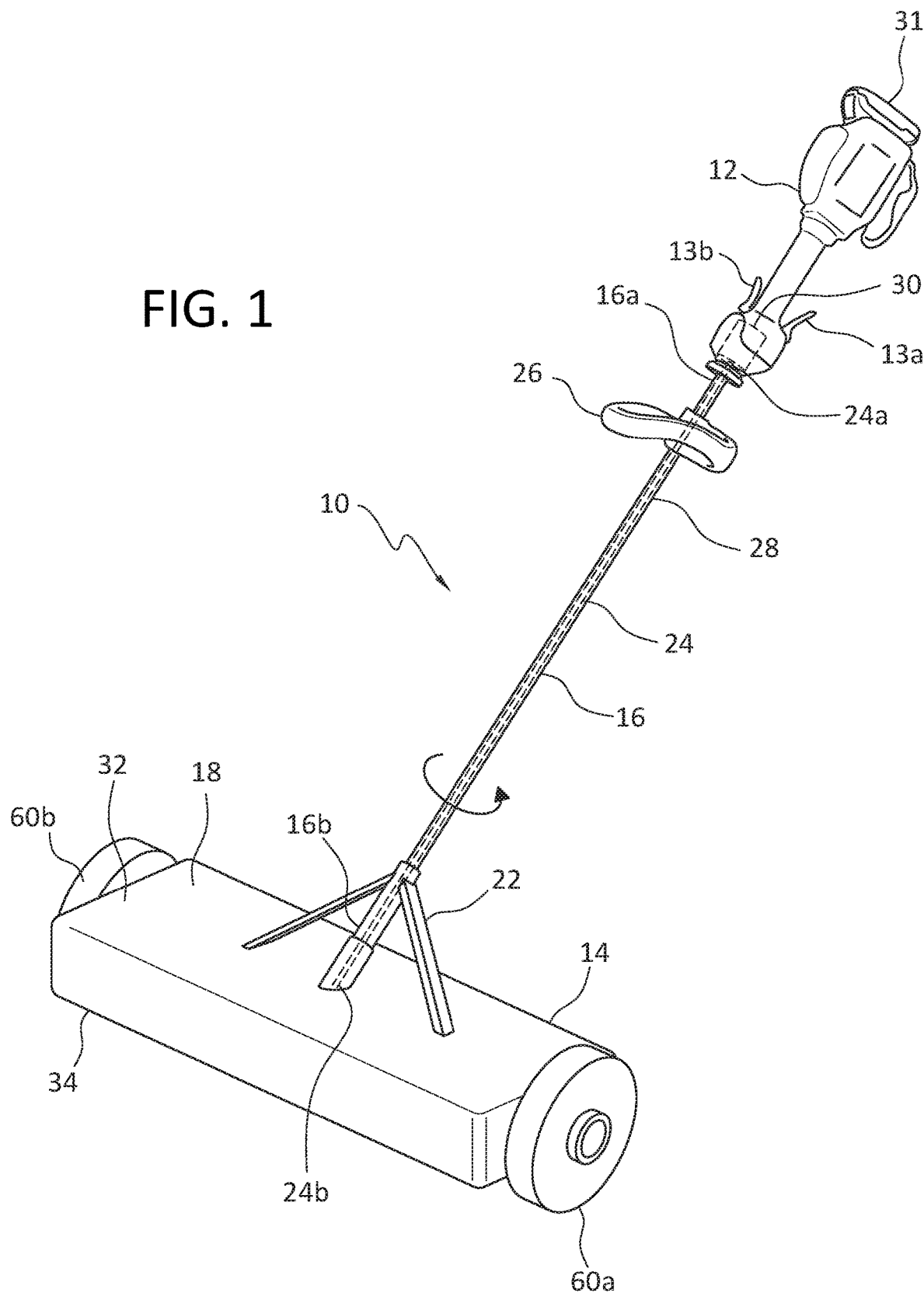
FIG. 1 is a perspective view of the handheld gardening tool in accordance with an embodiment of the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 to 4, a handheld gardening tool 10 is disclosed. The handheld gardening tool 10 includes a power source 12, a spike projection device 14 adapted to roughen soil for the application of grass seeds or to ease pulling weeds, and a support arm 16 connecting the power source 12 to the spike projection device 14. The spike projection device 14 comprising a housing 18 supporting a plurality of spikes 20 mounted within the housing 18 for controlled extension from and retraction within the housing 18 for engagement with soil.

More specifically, the handheld gardening tool 10 includes a cylindrical support arm 16 having a first end 16a and second end 16b. The power source 12 is connected to the first end 16a of the support arm 16, while the spike projection device 14 is connected to the second end 16b of the support arm 16. As shown in FIG. 1, first and second actuating control members 13a, 13b are connected to the power source 12 for controlling the application of power to the drive shaft 24 and spike projection device 14 of the handheld gardening tool 10 as will be appreciated based upon the following disclosure. Bracket members 22 extend between the support arm 16 and the housing 18 of the spike projection device 14 at the second end 16b of the support arm 16 to stabilize the spike projection device 14 relative to the support arm 16. A drive shaft 24 extends through the support arm 16 and connects the power source 12 to the spike projection device 14 in a manner known to those skilled in the art. In addition, and as is common with similar handheld gardening tools, an adjustable handle member 26 is secured along the central body portion 28 of the support arm 16.

Briefly, the first end 24a of the drive shaft 24 is secured to the power source 12 such that the power source 12 causes the drive shaft 24 to rotate. The rotary motion transmitted to the drive shaft 24 by the power source 12 is transferred to the spike projection device 14 that is secured to the second end 24b of the drive shaft 24.

In accordance with an embodiment of the present invention, the power source 12 is composed of an electric rotary motor 30 selectively secured to a rechargeable battery 31 to provide power to the electric rotary motor 30. Such electric rotary motors and rechargeable batteries are known in the art, and a variety of such devices may be used within the spirit of the present invention. In accordance with a preferred embodiment, the first actuating control member 13a is provided for controlling the on/off status of the power source 12 and the second actuating control member 13b is provided for variable speed control of the power source 12. For example, and in accordance with a disclosed embodiment, the rechargeable battery would be clipped onto the housing of the electric rotary motor in a manner known to those skilled in the art to prevent dislodgement thereof. Further, it is contemplated in accordance with a disclosed embodiment that the rechargeable battery could be an 18 Volt to 40 Volt DC rechargeable battery.

Figure 2:
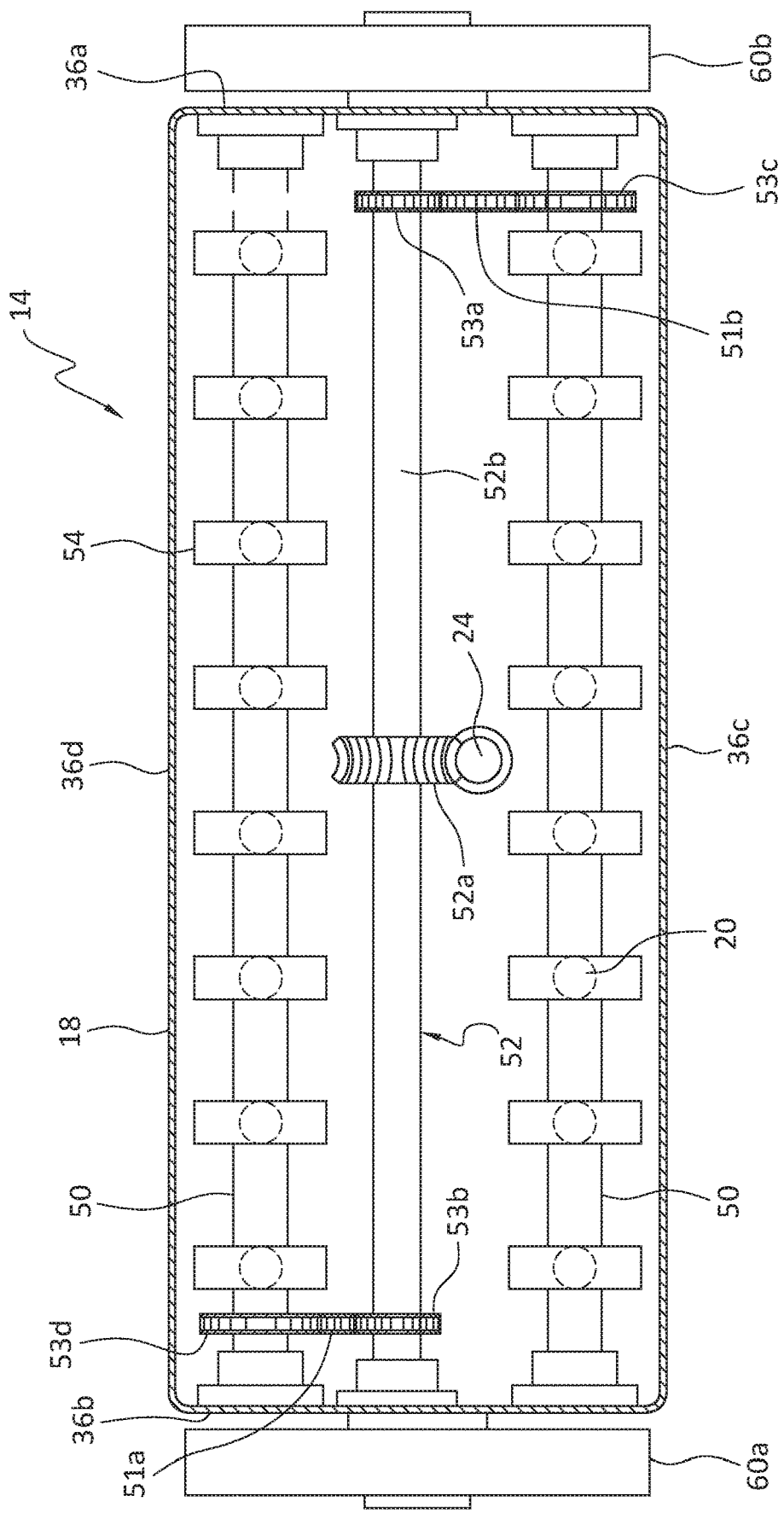
FIG. 2 is a bottom view of the handheld gardening tool shown in FIG. 1 with the base surface, cylindrical bearing members, and springs removed, and the spikes shown with broken lines.
Figure 3:
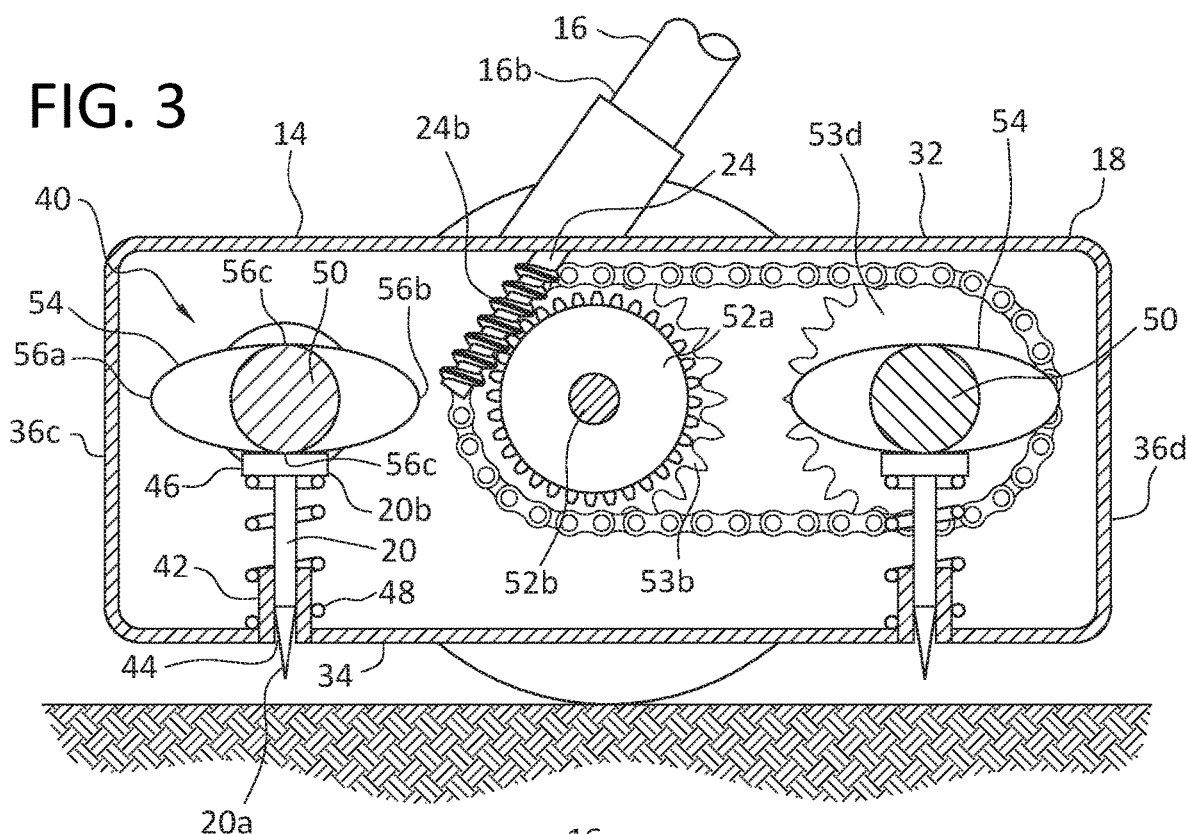
FIGS. 3 and 4 are lateral cross sectional views showing operation of the handheld gardening tool shown in FIG. 1.
Figure 4:
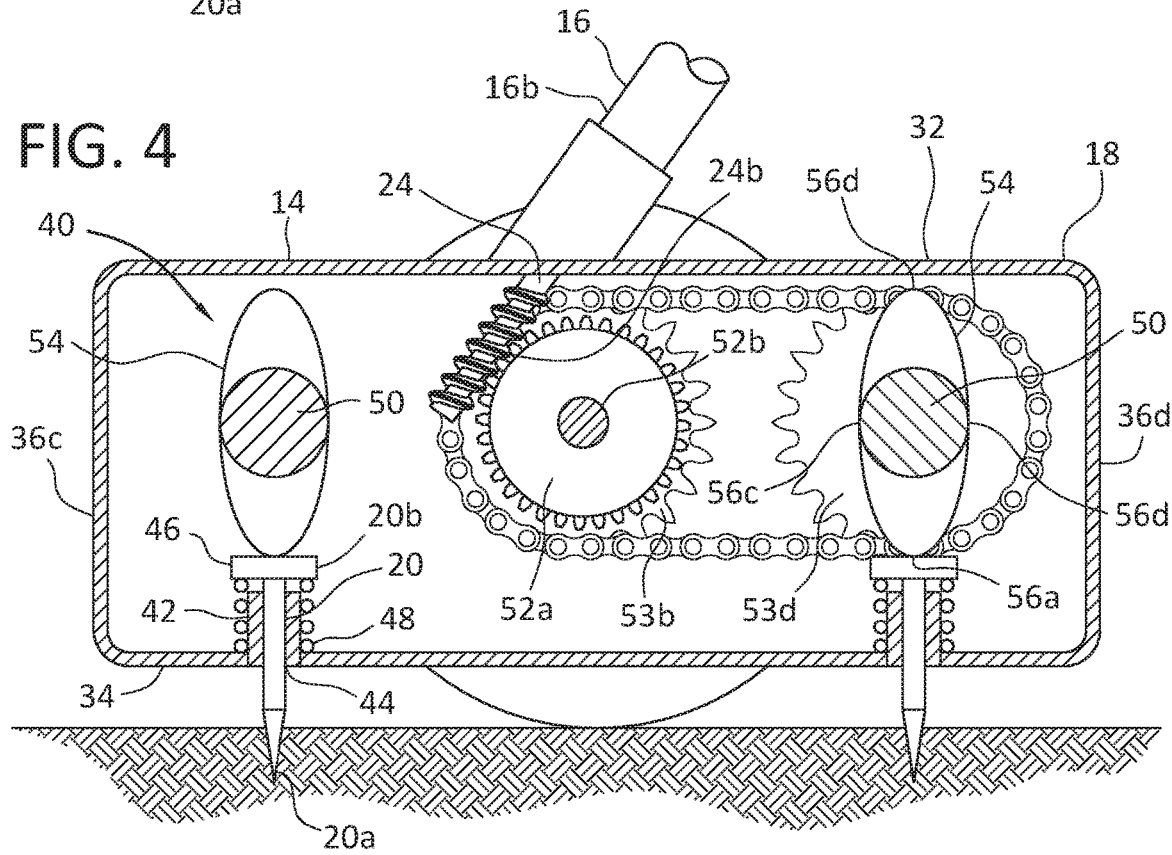

Turning now to FIGS. 2 to 4, which show the spike projection device 14 in detail, the spike projection device 14 includes a housing 18 supporting a plurality of spikes 20 mounted therein for controlled extension from and retraction within the housing 18 for engagement with soil. The housing 18 is substantially rectangular in shape and includes a top surface 32 (that is, the top wall of the housing 18) and a base surface 34 (that is, the base wall of the housing 18). The top surface 32 is connected to the base surface 34 via a plurality of sidewalls 36a-d to define an enclosed space 38. The sidewalls are composed of first and second short side walls 36a, 36b and first and second long side walls 36c, 36d extending between top surface 32 and the base surface 34. In accordance with an embodiment of the present invention, the housing 18 has a width (W) of 12 inches, a height (H) of 4 inches, and a depth (D) of 3 inches, although it is appreciated the specific dimensions could be varied to suit specific needs. In accordance with a preferred embodiment, the housing 18 is made from various durable metals and/or plastics known within the art (for example, aluminum) and the spikes 20 are preferably made of a hard metal (for example, steel). In addition, it is appreciate the housing 18 will weigh enough to counter upward forces as the spikes 20 penetrate the soil during operation of the handheld gardening tool 10.

The base surface 34 includes a plurality of apertures 44 through which the spikes 20 are selectively extended and retracted. As such, each of the plurality of spikes 20 is positioned for controlled extension through one of the apertures 44 formed along the base surface 34. In accordance with an embodiment of the present invention, and considering the 12"×4"×3" embodiment, 28 spikes each having a length of 3 inches would be used to provide appropriate extension from the housing 18 and penetration into the soil.

Each of the plurality of spikes 20 includes a pointed first end 20a and a second end 20b adapted for engagement with the camming mechanism 40 discussed below in greater detail. The spikes 20 are supported within a cylindrical bearing member 42 positioned in each of the apertures 44 such that the spikes 20 smoothly slide within the apertures 44. In addition, the second ends 20b of the spikes 20 are provided with heads 46 that have a diameter greater than the diameter of the opening defined by the cylindrical bearing member 42 within which the spikes 20 move. Further still, springs 48 are positioned between the internal wall of the base surface 34 and the head 46 of the spikes 20 so as to bias the spikes 20 in a direction away from the base surface 34 for engagement with a cam shaft 50 in manner disclosed below in greater detail.

Movement of the plurality of spikes 20 is controlled by a camming mechanism 40. The camming mechanism 40 includes a power input member 52 connected to the second end 24b of the drive shaft 24. The power input member 52 includes a central worm gear 52a that drive an elongated drive shaft 52b. The drive shaft 52b is connected in parallel to a plurality of cam shafts 50 via various chains 51a, 51b and gears 53a-d. The cam shafts 50 are shaped and dimensioned for engagement with the second ends 20b of the respective spikes 20 so as to drive the spikes 20 between their extended and retracted positions.

The cam shafts 50 each include a plurality of longitudinally spaced, annular eccentric camming surfaces 54 that interact with the heads 46 of respective spikes 20. In particular, each of the spikes 20 includes a camming surface along the top of the head 46 that interacts with the annular eccentric camming surface 54 during operation of the present device. As will be appreciated based upon the following disclosure, the annular eccentric camming surfaces 54 include diametrically opposed, first and second thickest portions 56a, 56b, which when in engagement with the head 46 of the spike 20 allows the spike 20 to move to its fully extended position under the bias of the springs 48, and diametrically opposed first and second thinnest portions 58a, 58b, which when in engagement with the head 46 of the spike 20 causes the spike 20 to move to its fully retracted position. Between the first and second thickest portions 56a, 56b and the first and second thinnest portions 58a, 58b of the annular eccentric camming surface 54, the annular eccentric camming surface 54 tapers to create a smooth transition as the head 46 of the spike 20 rides along the annular eccentric camming surface 54.

The previously mentioned springs 48 bias the heads 46 of the respective spikes 20 toward the camming surfaces 54 such that heads of the respective spikes 20 ride upon the camming surface 54 and the spikes 20 are forced downwardly as the cam shafts 50 rotate and the thicker portions 56a, 56b of the camming surface 54 come into contact with the head 46 of the spikes 20.

The spike projection device 14 is supported above the ground in a controlled manner through the inclusion of wheels 60a, 60b that are secured to the first and second short side walls 36a, 36b. The wheels 60a, 60b have a diameter slightly greater than the height of the housing 18 of the spike projection device 14, that is, the distance between the base surface 34 and the top surface 32. The diameter of the wheels 60a, 60b is only slightly greater than the height of the housing 18 so as to ensure that the base surface 34 is positioned, in use, close enough to the soil to allow the first end 20a of the spikes 20 to penetrate the soil. While wheels are provided in accordance with a disclosed embodiment, it is appreciated the housing may be constructed without wheels and would, therefore, be supported over the soil under the full control of the user.

In accordance with yet another embodiment of the present invention, the rotary drive mechanism is replaced with a linear drive mechanism. Referring to FIGS. 5 to 9 a handheld gardening tool 110 is disclosed. The handheld gardening tool 110 includes a power source 112, a spike projection device 114 adapted to roughen soil for the application of grass seeds or to ease pulling weeds, and a support arm 116 connecting the power source 112 to the spike projection device 114. The spike projection device 114 comprising a housing 118 supporting a plurality of spikes 120 mounted within the housing 118 for controlled extension from and retraction within the housing 118 for engagement with soil.

Figure 5:
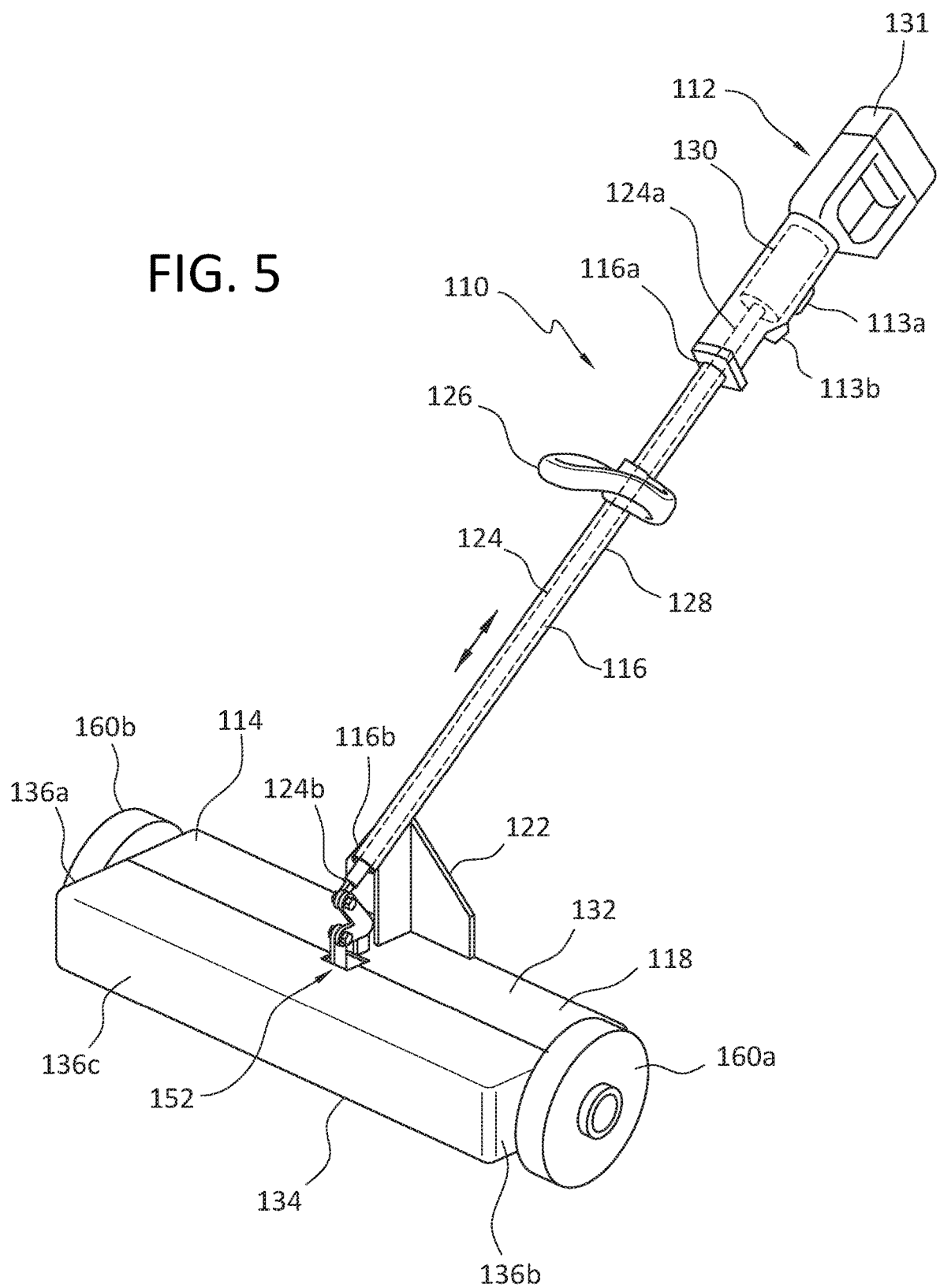
FIG. 5 is perspective view of a handheld gardening tool in accordance with another embodiment of the present invention.

More specifically, the handheld gardening tool 110 includes a cylindrical support arm 116 having a first end and second end 116a, 116b. The power source 112 is connected to the support arm 116 at the first end 116a of the support arm 116, while the spike projection device 114 is connected to the support arm 116 at the second end 116b of the support arm 116. As shown in FIG. 5, actuating control member(s) 113a, 113b are connected to the power source 112 for controlling the application of power to the functional elements of the handheld gardening tool 110 as will be appreciated based upon the following disclosure. In accordance with a preferred embodiment, a first actuating control member 113a is provided for controlling the on/off status of the power source 112 and a second actuating control member 113b providing variable speed control of the power source 112. A bracket member 122 extends between the support arm 116 and the housing 118 of the spike projection device 114 at the second end 116b of the support arm 116 to stabilize the spike projection device 114 relative to the support arm 116. A drive shaft 124 extends through the support arm 116 and connects the power source 112 to the spike projection device 114 in a manner known to those skilled in the art. A handle member 126 is secured along the central body portion 128 of the support arm 116.

Briefly, the first end 124a of the drive shaft 124 is secured to the power source 112 such that the power source 112 drives the drive shaft 24 in a reciprocal linear motion similar to the motion generated by a reciprocating saw. The linear motion transmitted to the drive shaft 124 by the power source 112 is transferred to the spike projection device 114 that is secured to the second end 124b of the drive shaft 124.

In accordance with an embodiment of the present invention, the power source 112 is composed of an electric reciprocating linear motor 130 selectively secured to a rechargeable battery 131 for the provision of power to the electric reciprocating linear motor 130. Such electric reciprocating linear motor and rechargeable batteries are known in the art, and a variety of such devices may be used within the spirit of the present invention. For example, and in accordance with a disclosed embodiment, the rechargeable battery would be clipped onto the housing of the electric reciprocating linear motor in a manner known to those skilled in the art to prevent dislodgement thereof. Further, it is contemplated in accordance with a disclosed embodiment that the rechargeable battery could be an 18 Volt to 40 Volt DC rechargeable battery.

Turning now to FIGS. 6 to 9, which show the spike projection device 114 in detail, the spike projection device 114 includes a housing 118 supporting a plurality of spikes 120 mounted therein for controlled extension from and retraction within the housing 118 for engagement with soil. The housing 118 is substantially rectangular in shape and includes a top surface 132 (that is, the top wall of the housing 118) and an open lower portion 134 from which the spikes 120 extend during use thereof. A plurality of sidewalls 36a-d extend downwardly from the perimeter of the top surface 132 to define an enclosed space 138 in which the spikes 120 are housed. The sidewalls are composed of first and second short side walls 136a, 136b and first and second long side walls 136c, 136d extending between top surface 132 and the open lower portion 134. In accordance with an embodiment of the present invention, the housing 118 has a width (W) of 12 inches, a height (H) of 4 inches, and a depth (D) of 3 inches, although it is appreciated the specific dimensions could be varied to suit specific needs. In accordance with a preferred embodiment, the housing 118 is made from various durable metals and/or plastics known within the art (for example, aluminum) and the spikes are preferably made of a hard metal (for example, steel). In accordance with an embodiment of the present invention, and considering the 12"×4"×3" embodiment, 30 spikes each having a length of 3 inches would be used to provide appropriate extension from the housing 118 and penetration into the soil. In addition, and as discussed above in conjunction with the prior embodiment, it is appreciate the housing 118 will weigh enough to counter upward forces as the spikes 120 penetrate the soil during operation of the handheld gardening tool 10.

Each of the plurality of spikes 120 includes a pointed first end 120a and a second end 120b adapted for fixed attachment to a mounting plate 140 housed within the housing 118. The mounting plate 140 includes an upper surface 140a and lower surface 140b. The mounting plate 140 is housed within the housing 118 for linear movement toward and away from the open lower portion 134 so as to extend the spikes 120 mounted thereto away from the housing 118 and into the ground. Linear movement of the mounting plate 140 within the housing 118 is achieved by the provision of guide members 142a, 142b along the first and second short side walls 136a, 136b that interact with mating guide members 144a, 144b extending from the mounting plate 140 to guide the mounting plate 140 as it moves within the housing 118. Further still, springs 148 are positioned between the internal wall of the top surface 132 and mounting plate 140 to assist in the movement of the mounting plate 140 in manner described herein.

As mentioned above, movement of the plurality of spikes 120 is controlled by a mounting plate 140 that is moved under the control of the drive shaft 124 as it is linearly moved under the control of the electric reciprocating linear motor 130. A power input member 152 links the second end 124b of the drive shaft 124 to the mounting plate 140. The power input member 152 includes a pivoting linkage assembly that drives the mounting plate in an up and down manner. The power input member 152 includes a L-shaped linkage member 154 having a first end 154a pivotally linked to the second end 124b of the drive shaft 124, a central portion 154b pivotally secured to a bracket 118b extending upwardly from the housing 118 and a second 154c pivotally secured to a first end 156a of an elongated linkage member 156, where in the second end 156b of the elongated linkage member 156 is pivotally secured to the upper surface 140a of the mounting plate 140.

As with the prior embodiment, the spike projection device 114 is supported above the ground in a controlled manner through the inclusion of wheels 160a, 160b that are secured to the first and second short side walls 136a, 136b. The wheels 160a, 160b have a diameter slightly greater than the height of the housing 118 of the spike projection device 114, that is, the distance between the base surface 134 and the top surface 132. The diameter of the wheels 160a, 160b is only slightly greater than the height of the housing 118 so as to ensure that the open lower portion 134 is positioned, in use, close enough to the soil to allow the first end 120a of the spikes 120 to penetrate the soil. While wheels are provided in accordance with a disclosed embodiment, it is appreciated the housing may be constructed without wheels and would, therefore, be supported over the soil under the full control of the user.

In accordance with an alternate embodiment of the those embodiments presented above, it is contemplated the single support arm could be replaced with first and second parallel support arms in a manner similar to a traditional push lawn mower. In accordance with such an embodiment, the first and second parallel support arms would be secured at their second ends to the spike projection device and to a handle member at their first ends. In implementing such an embodiment, it is contemplated the power source and drive shaft would be integrated with on one of the first and second support arms.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A handheld gardening tool, comprising:
a power source;
a spike projection device adapted to roughen soil for the application of grass seeds or to ease pulling weeds; and
a support arm connecting the power source to the spike projection device, the support arm includes a first end and a second end, the power source is connected to the first end of the support arm and the spike projection device is connected to the second end of the support arm, a drive shaft extends through the support arm and connects the power source to the spike projection device;
the spike projection device comprising a housing supporting a plurality of spikes mounted within the housing for controlled extension from and retraction within the housing for engagement with soil, the housing includes a top surface and an open lower portion from which the plurality of spikes extend during use thereof, the plurality of spikes are linearly driven by the drive shaft relative to the housing for linear movement so as to extend the plurality of spikes away from the housing and into the ground.

2. The handheld gardening tool according to claim 1, wherein in the power source includes an electric reciprocating linear motor secured to a rechargeable battery.

3. The handheld gardening tool according to claim 1, wherein the power source includes an electric rotary motor selectively secured to a rechargeable battery.

4. The handheld gardening tool according to claim 3, wherein the spike projection device includes a camming mechanism that controls the movement of the spikes.

5. The handheld gardening tool according to claim 4, wherein the camming mechanism includes a plurality of cam shafts.

6. The handheld gardening tool according to claim 1, wherein the drive shaft is driven by an electric reciprocating linear motor.

7. The handheld gardening tool according to claim 1, further including a handle member that is secured along a central body portion of the support arm.

8. The handheld gardening tool according to claim 1, wherein the spike projection device includes wheels secured to the housing for supporting the spike projection device above the ground.

9. The handheld gardening tool according to claim 8, wherein a diameter of the wheels is greater than a height of the housing so as to ensure that the housing is positioned, in use, close enough to the soil to allow the spikes to penetrate the soil.

10. The handheld gardening tool according to claim 1, wherein the plurality of spikes are mounted upon a mounting plate and the mounting plate is linearly driven by the drive shaft relative to the housing for linear movement of the mounting plate so as to extend the plurality of spikes mounted thereto away from the housing and into the ground.

11. The handheld gardening tool according to claim 1, wherein the housing includes a top surface and an open lower portion from which the plurality of spikes extend during use thereof.

12. The handheld gardening tool according to claim 11, wherein the housing includes a plurality of sidewalls extend downwardly from the perimeter of the top surface to define an enclosed space in which the plurality of spikes are housed.

13. The handheld gardening tool according to claim 1, wherein a pivoting linkage member is positioned between the mounting plate and the drive shaft for linking the mounting plate to the drive shaft.

14. A handheld gardening tool, comprising:
a power source including an electric rotary motor selectively secured to a rechargeable battery;
a spike projection device adapted to roughen soil for the application of grass seeds or to ease pulling weeds; and
a support arm connecting the power source to the spike projection device;
the spike projection device comprising a housing supporting a plurality of spikes mounted within the housing for controlled extension from and retraction within the housing for engagement with soil, wherein the spike projection device includes a camming mechanism that controls the movement of the spikes and the camming mechanism includes a plurality of cam shafts, the cam shafts including annular eccentric camming surfaces that interact with the heads of respective spikes.

15. A handheld gardening tool, comprising:
a power source;
a spike projection device adapted to roughen soil for the application of grass seeds or to ease pulling weeds; and
a support arm connecting the power source to the spike projection device;
the spike projection device comprising a housing supporting a plurality of spikes mounted within the housing for controlled extension from and retraction within the housing for engagement with soil, the spike projection device further including a mounting plate to which the plurality of spikes are secured, a drive shaft extends through the support arm and connects the power source to the spike projection device, the drive shaft being driven by an electric reciprocating linear motor and a power input member linking the mounting plate to the drive shaft, wherein the power input member is a pivoting linkage assembly.

16. A handheld gardening tool, comprising:
a power source;
a spike projection device adapted to roughen soil for the application of grass seeds or to ease pulling weeds; and
a support arm connecting the power source to the spike projection device;
the spike projection device comprising a housing supporting a plurality of spikes mounted within the housing for controlled extension from and retraction within the housing for engagement with soil, the spike projection device including a camming mechanism driving the plurality of spikes, a drive shaft driven by an electric rotary motor extends through the support arm to connect the power source to the spike projection device, and a power input member links the camming mechanism to the drive shaft.

* * * * *